(No Model.)
J. FOGARTY.
Harrow.
No. 242,766. Patented June 14, 1881.
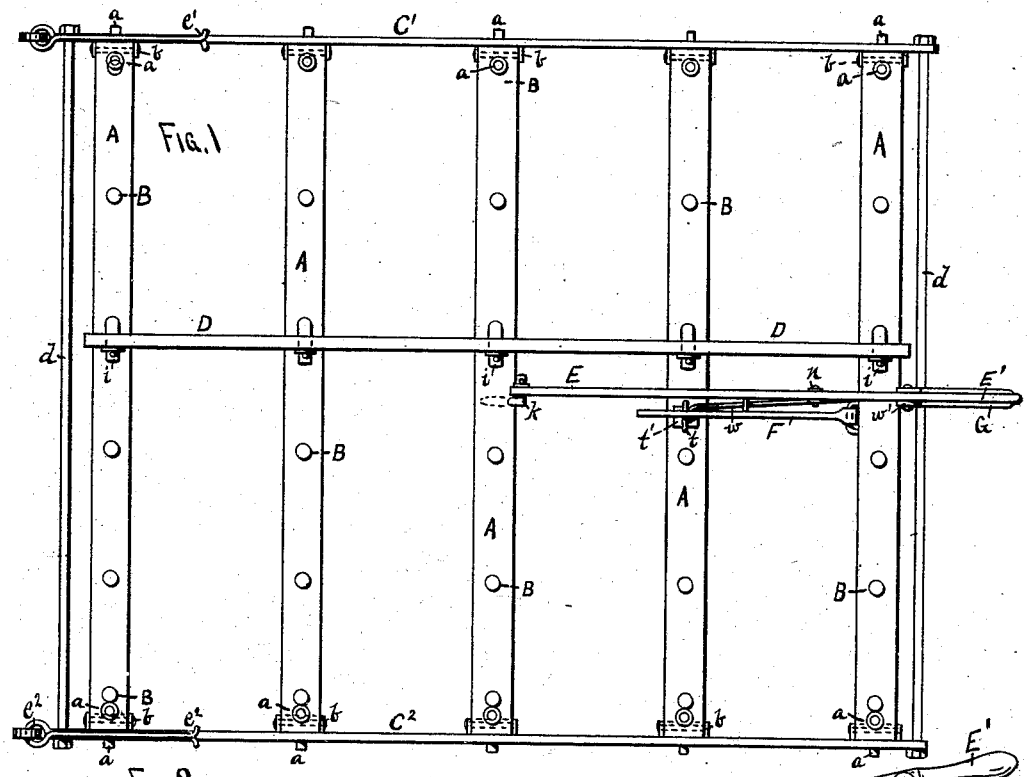
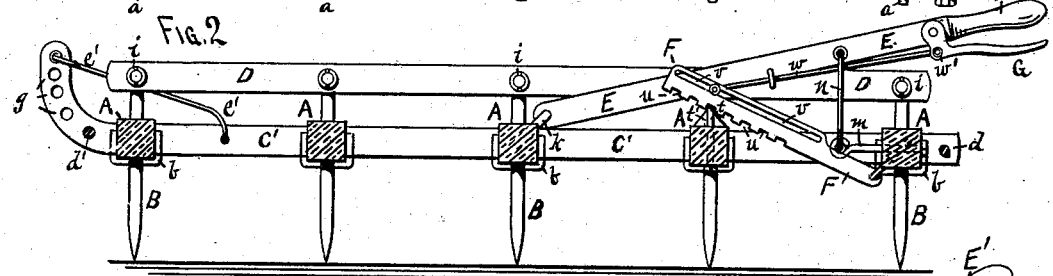
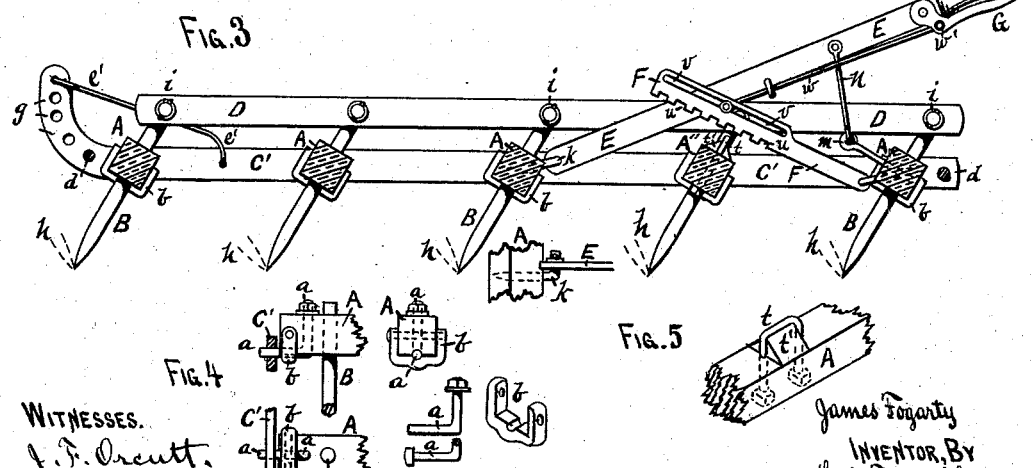
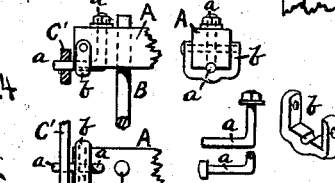
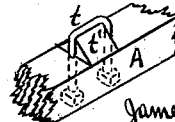
WITNESSES.
J. F. Orcutt.
Edward Rotert.
James Fogarty
INVENTOR, By
Louis Feeser & Leo.
Attys.

UNITED STATES PATENT OFFICE.

JAMES FOGARTY, OF RICHFIELD, MINNESOTA.

HARROW.

SPECIFICATION forming part of Letters Patent No. 242,766, dated June 14, 1881.

Application filed April 3, 1880. (No model.)

*To all whom it may concern:*

Be it known that I, JAMES FOGARTY, of Richfield, in the county of Hennepin and State of Minnesota, have invented a new and useful Improvement in Harrows, of which the following is a specification.

This invention relates to that class of harrows in which the teeth-bars are pivoted in connecting-rods, and adapted to be tilted forward and backward to change the angle of inclination of the teeth; and it consists in the novel construction and arrangement of the vibrating tooth-bars and lifting and locking mechanism, as will be hereinafter and in detail explained.

I attain these objects by the mechanism set forth in the accompanying drawings, in which—

Figure 1 is a plan view. Fig. 2 is a sectional side elevation with the teeth perpendicular, and Fig. 3 is a similar view with the teeth tilted backward; Fig. 4, detail views, detached, of the device for pivoting the tooth-bars to the side bars; Fig. 5, a perspective view of the lug or catch of the holding-dog detached.

A A are the tooth-bars, and B the teeth, all formed in the usual manner, in any of the well-known styles. Near the ends of each bar holes are bored parallel with the teeth to receive bolts $a$ $a$. On the lower sides of the bars A, between these holes and the ends of the bars, semicircular grooves are cut to receive the bolts $a$, which are bent at right angles and project out beyond the ends of the bars A, as shown in Fig. 4, to form pivots for the side bars, $C'$ $C^2$.

$b$ $b$ are metal straps formed to fit over the bolts $a$, and pass up each side of the bars A, as shown in Fig. 4, and secured thereto by rivets or bolts passing through the upper ends of the straps, and also through the bars A. By this means the bolts $a$ are not only held firmly in place, but the ends of the bars A clamped and prevented from splitting. Cross-rods $d$ will be run across from one bar, $C'$, to the other, $C^2$, before the forward bar A, and in the rear of the back bar A, to hold the side bars upon the pivots $a$; or heads may be formed upon the outer ends of the pivots to hold the bars in place; or nuts or keys may be used, as desired. The forward ends of the side bars, $C'$ $C^2$, will be curved upward, as shown in Figs. 2 and 3, and provided with a number of holes, $g$, to receive the chains or hooks of the single-trees, to which the horses are attached, so that the draft may be adjusted higher or lower. To strengthen these curved ends and prevent the bars being drawn out straight by the strain, braces $e'$ $e^2$ will be arranged to connect the upper ends of the curved part with the main portion of the bars, as shown. The tooth B nearest the center of each bar A will be extended upward two or three inches above the bars and bent over at right angles to form pivots $i$, on which a connecting-bar, D, is placed to connect the bars to each other, so that when one bar is tilted all the remainder will be carried with it. Small pins or keys will be inserted through the ends of the pivots $i$, to hold the bar D in place.

E is a lever pivoted to one of the center tooth-bars A by a standard, $k$, passing into or through the bar A, and bent over at right angles to form a pivot, on which the lever E is set, and to which it will be secured by a pin, key, nut, or similar device. This lever E runs backward at an upward incline over the tops of the tooth-bars, and projects beyond the rear of the harrow and ends in a handle, $E'$.

$m$ is a small rod projecting forward at right angles to the teeth B from the rear tooth-bar, and connected at its forward end to the lever E by a small rod, $n$. By this means, when the lever E is lifted, the rear bar A will be revolved on its pivots $a$, and, through the connecting-bar D, revolve all the tooth-bars A, and cause the teeth to be inclined backward, as shown in Fig. 3, and then again by depressing the lever E the reverse movement will occur, and the teeth set at the opposite angle, as shown by dotted lines at $h$ in Fig. 3. By this arrangement the teeth may be inclined to any degree forward or backward, or placed perpendicularly by simply raising or lowering the lever E.

F is a dog or holding-bar pivoted to the lower side of the rear bar A, and passing forward and upward and resting across the next bar, $A''$. This second bar, $A''$, is provided with a stop or lug, $t$, adapted to fit into teeth or notches $u$ on the lower side of the dog F, by which means the bars A are locked at any desired angle. Through the upper edge of the dog F a long slot, $v$, is formed, in which the end of a rod, $w$, runs, and is pivoted, at $w'$, in a small right-angled lever, G, attached to the handle E′, so that when the lever G and handle E′ are grasped by the hand of the operator, and the lever G brought up against the handle E′, as shown in Fig. 3, the rod $w$ will lift the dog F upward and disconnect it from the lug $t$ and release the bars A, so that they may be tilted backward or forward, as before described. Then when the lever G is released the weight of the dog F will cause it to drop down again and be caught by whatever tooth $u$ is opposite the lug $t$ and "lock" the harrow at any desired angle. Thus the teeth may be adjusted and locked at any desired angle by one movement—viz., the levers E and G—and thus enable the harrow to be adapted to any kind of work or soil.

The lug $t$ is formed by a staple or yoke passed down through the bar A″ and held therein by nuts on the lower side, and provided with a block, $t'$, by which it is supported.

Springs may be used to throw the dog F down when released by the lever G, if desired.

The bolts $a$ may be let into the wood, as shown, on the bottoms of the bars A; or the grooves in the straps $b$ may be deep enough to receive the whole depth of the bolts.

Having thus described my invention, what I claim as new, and desire to secure by Letters Patent, is—

1. In combination with the lever E, pivoted bar A, provided with lug $t$, the toothed and slotted pawl-bar F, and lever-connections G, substantially as set forth.

2. The bars A, provided at their ends with connecting vertical and horizontal passages for right-angled bolts $a$, and provided with straps $b$, for supporting the pivoted ends of the bolts $a$, and serving as a binder to the bars A, substantially as and for the purpose set forth.

3. In a harrow, the combination of the bars A, constructed as described, with the right-angled bolts $a$ and the straps $b$, substantially as set forth.

In testimony whereof I have hereunto set my hand in the presence of two subscribing witnesses.

JAMES FOGARTY.

Witnesses:
LOUIS FEESER,
C. N. WOODWARD.